United States Patent
Ragot et al.

(10) Patent No.: US 12,424,886 B2
(45) Date of Patent: Sep. 23, 2025

(54) ROTOR AND METHOD FOR PRODUCING A ROTOR

(71) Applicant: Bayerische Motoren Werke Aktiengesellschaft, Munich (DE)

(72) Inventors: Jerome Ragot, Munich (DE); Robert Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 66 days.

(21) Appl. No.: 18/282,882

(22) PCT Filed: Apr. 13, 2022

(86) PCT No.: PCT/EP2022/059821
§ 371 (c)(1),
(2) Date: Sep. 19, 2023

(87) PCT Pub. No.: WO2022/233550
PCT Pub. Date: Nov. 10, 2022

(65) Prior Publication Data
US 2024/0162767 A1 May 16, 2024

(30) Foreign Application Priority Data
May 5, 2021 (DE) .................. 10 2021 111 588.4

(51) Int. Cl.
*H02K 1/24* (2006.01)
*H02K 13/02* (2006.01)
*H02K 15/022* (2025.01)

(52) U.S. Cl.
CPC .............. *H02K 1/24* (2013.01); *H02K 13/02* (2013.01); *H02K 15/022* (2013.01)

(58) Field of Classification Search
CPC ........ H02K 15/022; H02K 1/24; H02K 3/527; H02K 13/02
See application file for complete search history.

(56) References Cited

U.S. PATENT DOCUMENTS

| 7,569,969 B2* | 8/2009 | Nakano | H02K 1/30 |
| | | | 310/264 |
| 2003/0011257 A1* | 1/2003 | Akemakou | H02K 9/06 |
| | | | 310/91 |

(Continued)

FOREIGN PATENT DOCUMENTS

| DE | 603 00 428 T2 | 8/2005 |
| DE | 10 2011 088 697 | 6/2013 |

(Continued)

OTHER PUBLICATIONS

International Search Report (PCT/ISA/210) issued in PCT Application No. PCT/EP2022/059821 dated Sep. 2, 2022 with English translation (4 pages).

(Continued)

*Primary Examiner* — Leda T Pham
(74) *Attorney, Agent, or Firm* — Crowell & Moring LLP

(57) ABSTRACT

The invention relates to a rotor, in particular for a current-excited synchronous machine, comprising a rotor main body which has a plurality of rotor teeth, the rotor teeth being wound with a conductor material in order to form a winding, the conductor material having conductor ends which, in order to produce an electrical connection, are pressed axially against a stop via a contact element, and the contact element or the stop being designed to electrically connect, in the circumferential direction, at least two conductor ends.

7 Claims, 2 Drawing Sheets

(56) References Cited

U.S. PATENT DOCUMENTS

| | | | |
|---|---|---|---|
| 2003/0155835 A1 | 8/2003 | Kondo et al. | |
| 2004/0095036 A1* | 5/2004 | Yamamoto | H02K 3/28 |
| | | | 310/233 |
| 2020/0336050 A1 | 10/2020 | Loos | |

FOREIGN PATENT DOCUMENTS

| | | |
|---|---|---|
| DE | 10 2018 202 624 A1 | 8/2019 |
| EP | 1 793 471 A1 | 6/2007 |
| EP | 3 716 447 A1 | 9/2020 |
| JP | 2004-96847 A | 3/2004 |
| JP | 2019-126119 A | 7/2019 |

OTHER PUBLICATIONS

German-language Written Opinion (PCT/ISA/237) issued in PCT Application No. PCT/EP2022/059821 dated Sep. 2, 2022 with English translation (9 pages).
German-language Search Report issued in German Application No. 10 2021 111 588.4 dated Apr. 4, 2022 with partial English translation (12 pages).

* cited by examiner

ROTOR AND METHOD FOR PRODUCING A ROTOR

BACKGROUND AND SUMMARY OF THE INVENTION

The present invention relates to a rotor, in particular for a current-excited or separately excited synchronous machine, and to a method for producing a rotor.

Conductor material, for example copper wire, is wound around rotors of the type in question. The conductor ends of the windings created in this way must be connected to one another. Similarly, to supply current, the windings must for example be electrically connected to what is referred to as a current collector. It has been found that contact-connecting the conductor ends is not without problems. Thus, very high forces act on the rotor during operation owing to the high rotational speeds. Crimped connections in these regions often do not withstand the loading. There is also the fact that, for the purpose of mechanical stabilization, the windings are usually surrounded by a potting compound. This can result in cracks appearing in the latter during cooling or only later during operation. If these cracks propagate out toward the conductor ends or connecting wires, this can lead to the wires breaking at these locations.

It is therefore an object of the present invention to specify a method for producing a rotor and a rotor, it being the intention in particular to optimize the electrical contact-connection of the winding(s).

This object is achieved by a rotor and by a method according to the claimed invention. Further advantages and features will emerge from the description and from the appended figures.

According to embodiments of the invention, a rotor, in particular for a current-excited or separately excited electric machine, in particular a synchronous machine, comprises a main rotor body, which comprises or forms a plurality of rotor teeth, wherein conductor material is wound around the rotor teeth to form a winding, wherein the conductor material has conductor ends, also referred to as connecting wires, which are pressed axially against a stop by a contact element to establish an electrically conductive connection, and wherein the contact element and the stop are designed to electrically conductively connect at least two conductor ends in the circumferential direction. Advantageously, the pressing of the conductor ends against a stop or against a stop element enables a secure and primarily gentle electrical contact-connection of the conductor ends. In particular, the pressing can be understood as meaning a form-fitting or form- and force-fitting arrangement of the contact element at the conductor ends, wherein the stop supports and, for example, positionally fixes the conductor ends.

According to a preferred embodiment, the conductor material is copper wire, for example with a round, in particular circular, cross section. The conductor ends have, for example, a length of a few millimeters to several centimeters, for example 5 mm to 30 mm. Expediently, the conductor ends are pressed over this entire length, wherein the introduction of force over a large surface area enables a very gentle contact-connection. The introduction of force during the pressing operation is effected in this case expediently along the rotor axis, that is to say in the axial direction of the rotor. The stop or the stop element is perpendicular or substantially perpendicular thereto. The contact element is designed to push, in particular to press, the conductor ends or connecting wires against the stop. To this end, for example, the contact element is moved over the rotor shaft toward the main rotor body. According to a preferred embodiment, the main rotor body is a laminated rotor core which is stacked from a plurality of sheet-metal laminations to afford the laminated rotor core.

According to a preferred embodiment, the main rotor body or the laminated rotor core is surrounded with a potting compound to form a sheath. In this respect, the potting compound expediently forms a layer or ply around the laminated rotor core, on which layer or ply the conductor material is disposed. It has been found to be particularly advantageous to form the stop directly via the potting compound, which according to a preferred embodiment is applied by injection molding. According to one embodiment, the stop is formed by a planar or substantially planar stop surface, which is preferably oriented perpendicularly to the rotor axis. At this juncture, it should be pointed out that the aforementioned conductor ends or connecting wires are also expediently oriented such that they are substantially perpendicular or perpendicular to the rotor axis. In particular, they are in addition also radial in relation to the rotor axis. In other words, the orientation of the conductor ends can also be referred to as ray-like.

According to one embodiment, the contact element or the stop comprises at least one conductor element, which makes it possible to provide the electrically conductive connection between the at least two conductor ends in the circumferential direction. The at least one conductor element may be a busbar or else at least one (copper) wire. According to one embodiment, the conductor element is potted in the sheath. As an alternative, the at least one conductor element is potted in the contact element. During the pressing operation, advantageously there is a form-fitting or form- and force-fitting contact-connection of the at least one conductor element.

According to one embodiment, the contact element is made from a plastic. According to a preferred embodiment, the contact element has an annular shape. According to one embodiment, the contact element has an arrangement region, for example in the form of a slot, in which a conductor element or possibly also multiple conductor elements can be arranged.

According to a preferred embodiment, the contact element is axially positionally fixed by a securing element. In addition, force can also be introduced via the securing element to press the connecting wires. Expediently, for example an engagement region, such as a thread, is provided to arrange the securing element on the rotor shaft, the thread being designed to interact with the securing element. The engagement region is in particular provided and designed to introduce a force into the contact element via the securing element. In addition or as an alternative, it is expediently designed to enable fixing of the securing element along the rotor axis, as a result of which the contact element is also axially positionally fixed as a result. According to a preferred embodiment, the securing element is also manufactured from a plastics material. According to a preferred embodiment, the securing element also has an annular shape.

According to one embodiment, the contact element or the stop has a plurality of pockets which have a ray-like arrangement and are intended for arranging and positioning the conductor ends. As already mentioned, the conductor ends or connecting wires also expediently have a corresponding ray-like arrangement. The aforementioned pockets are expediently adapted to the aforementioned orientation of the conductor ends. If the conductor ends have a different orientation, the pockets are expediently also formed/oriented differently. Expediently, the pockets enable secure positioning or prepositioning of the conductor ends, in particular also fixing, without tension. The conductor ends are advantageously press-fixed in the present case. The contact element advantageously enables not just a simple contact-connection, but also positioning and/or fixing of the conductor ends. Advantageously, when the contact element is being arranged, the conductor ends are pressed into the pockets.

According to one embodiment, the pockets may be provided on the stop. As an alternative, the pockets may also be formed on the contact element. A combination is also conceivable in the present case.

Advantageously, at least two of the pockets are connected by a conductor element. It is thus possible to provide the electrically conductive connection between two pockets or between the conductor ends arranged therein in the circumferential direction. The contact-connection of the conductor ends to the conductor elements to supply current in the circumferential direction is effected during the arrangement of the contact element or during the pressing operation.

In the present case, the pressing operation is to be understood to the effect that the conductor ends are pushed against the stop by the contact element via an axial introduction of force. In this respect, a contact-connection of the conductor elements present either in the stop or in the contact element is effected. The pressing operation is to be understood to the effect that the contact-connection is effected in such a way that a sufficiently great frictional engagement is created, which fixes the conductor ends and the at least one conductor element reliably to one another. In order to further increase the frictional engagement, the contact element and/or the stop and/or the pockets and/or also the conductor ends may be at least slightly plastically deformed during the pressing operation.

According to one embodiment, an intermediate element or intermediate elements, which are designed to deform during the pressing operation for connection to the conductor element, are arranged in at least one pocket or are arranged in the pockets. According to a preferred embodiment, the intermediate elements are metal insert elements which can be arranged in the pockets. Expediently, the intermediate elements in turn form slots or the like in order to be able to insert the conductor elements there. During the pressing operation, the intermediate elements deform, the result of which is to securely fix the conductor ends.

The intermediate element expediently provides the electrically conductive connection to the at least one conductor element. In other words, the intermediate element and the conductor element expediently rest against one another.

According to one embodiment, the contact element and/or the sheath are/is designed to provide an electrically conductive connection to a current collecting element or slip ring module along a rotor axis. Expediently, to this end, corresponding electrical conductor elements, for example in the form of busbars and/or conductor material, such as (copper) wires, are arranged in the contact element and/or in the sheath.

According to one embodiment, the contact element is in the form of or comprises a current collecting element. The current collecting element is a component which, according to one embodiment, is arranged on a rotor shaft of the rotor and at which the conductor ends/connecting wires of the windings converge and are connected. The current collecting element is expediently electrically connected to the slip rings of the rotor in a suitable way. Expediently, the current collecting element in the present case may itself be in the form of a contact element. As a further alternative, it is also possible for the slip ring module to comprise or form the contact element.

The invention also relates to a method for producing a rotor, comprising the following steps:
  providing a rotor body and winding conductor material around it to form a winding, wherein the winding has conductor ends;
  pressing the conductor ends against a stop via a contact element;
  establishing an electrically conductive connection between at least two conductor ends via the contact element or the stop.

Advantageously, the conductor elements are pressed against a stop by an axial introduction of force. Expediently, to this end a corresponding contact element is used. Expediently, conductor elements, which enable the conduction of current in the circumferential direction, are arranged in the contact element or else in the stop. The conductor ends can therefore be connected securely and reliably. In this respect, it is particularly advantageous for the conductor ends to be supported over a large surface area by the contact element. This requires not just a gentle introduction of force but in particular also for these sensitive regions of the winding to be shielded over a large surface area. Thus, after the winding-around operation, encapsulation by injection molding or by potting with potting compound, which here for example is a thermosetting plastic or a thermoplastic, is usually carried out to mechanically stabilize the winding. It is not unusual for cracks to arise in this potting compound already during cooling or only later during operation. If these cracks propagate toward the connecting wires or conductor ends, this can be problematic, since there is the risk that the contact-connection in the region of the conductor ends is lost. The use of the contact element advantageously protects these regions and makes it possible to avoid the aforementioned problem arising.

Further advantages and features will emerge from the following description of embodiments of rotors with respect to the appended figures.

DETAILED DESCRIPTION OF THE DRAWINGS

Figure 1:
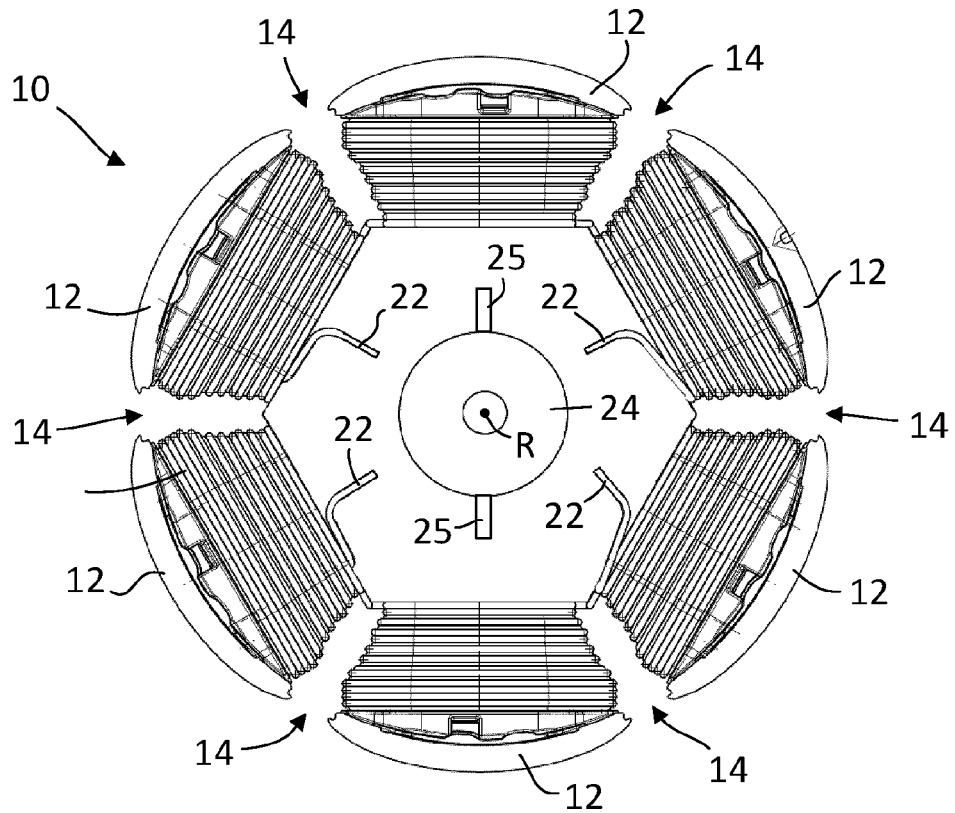
FIG. 1 shows a view of the end face of a rotor with conductor ends, which must be connected.

FIG. 1 shows a view of the end face of a rotor 10, as seen along a rotor axis R, which has a plurality of, in the present case six, rotor teeth 12 with rotor slots 14 in between. The rotor teeth 12 are surrounded with conductor material 20, for example copper wire. The conductor material 20 forms conductor ends or connecting wires 22, which are arranged approximately radially or in ray-like fashion in relation to the rotor axis R. Reference sign 24 shows, illustrated schematically, a current collecting element 24, comprising two connection lugs 25. The challenge in the present case consists in electrically connecting corresponding conductor ends 22 or else conductor ends 22 to the connection lugs 25 of the current collecting element 24. According to embodiments of the invention, this is effected by a contact element 40, as is outlined in FIG. 2.

Figure 2:
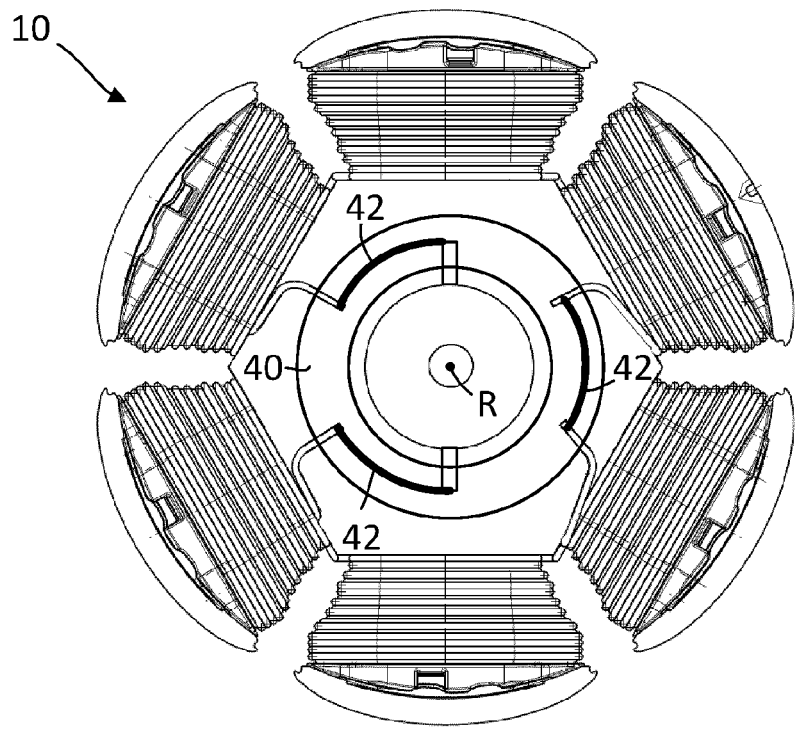
FIG. 2 shows the view known essentially from FIG. 1 of a rotor, with a contact element being arranged here.

FIG. 2 shows the view known essentially from FIG. 1 of a rotor 10, with a contact element 40 which in the present case comprises three conductor elements 42 being arranged along the rotor axis R here. The conductor elements make it possible to contact-connect corresponding conductor ends to one another or to the connection lugs; cf. FIG. 1. To better understand this contact-connection, FIGS. 3 and 4 are provided.

Figure 3:
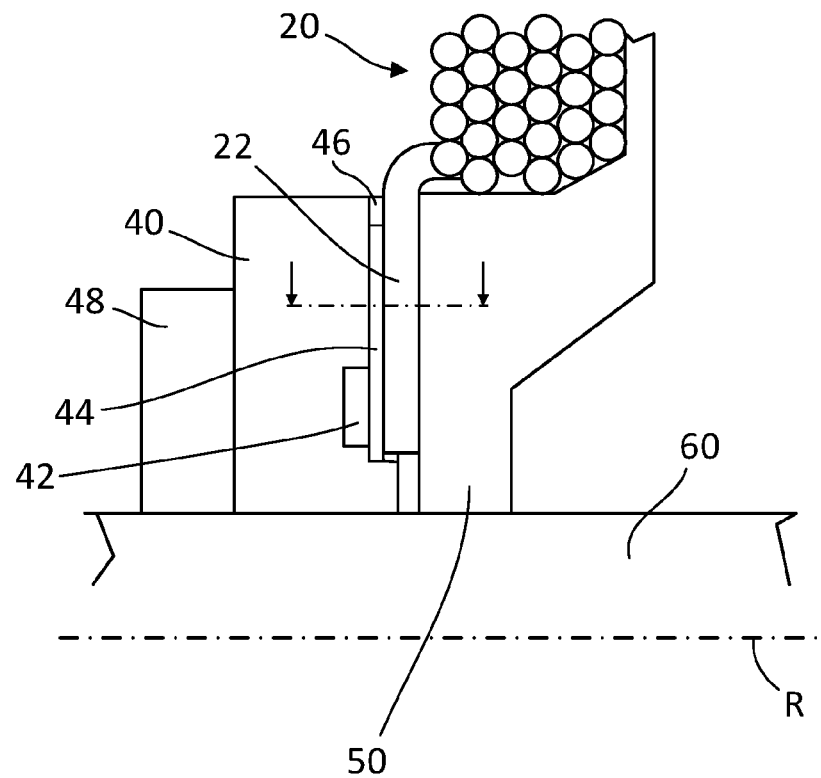
FIG. 3 shows a schematic view of a detail of one embodiment of a rotor.

FIG. 3 shows a schematic view of a detail of a section through a rotor along a rotor axis R. A winding or conductor material 20, out of which a conductor end 22 extends, can be seen. This region is illustrated from the front, that is to say as seen along the rotor axis R, in FIGS. 1 and 2. It can be seen that the conductor ends 22 rest against a stop 50. The conductor ends 22 are pressed against this stop 50 by a contact element 40. The contact element 40 has a pocket or slot 46 in which the conductor end 22 is arranged. In the embodiment outlined here, an intermediate element 44 is arranged in the pocket or slot 46. The contact element 40 has a conductor element 42 which is designed and provided to establish an electrically conductive connection in the circumferential direction; cf. also FIG. 2. In order to hold the contact element 40 securely in this position, in the present case a securing element 48 is provided. The reference sign 60 denotes a schematically illustrated rotor shaft 60. In the present case, what is indicated is that the stop 50 is effected directly via a sheath of a main rotor body, which is not illustrated further here. According to a preferred embodiment, the main rotor body consists of a plurality of sheet-metal laminations which are stacked to form a rotor core. Typically, this rotor core is surrounded with a sheath of a plastics material. It has proven to be advantageous to form the stop 50 directly via this sheath. The dash-dotted line indicates a section, which is outlined in FIG. 4.

Figure 4:
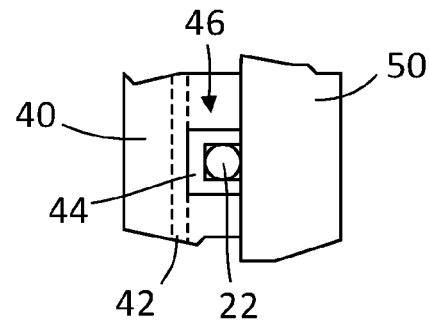
FIG. 4 shows a section, as outlined in FIG. 3.

FIG. 4 shows the section as outlined in FIG. 3. The stop element 50 and a slot or pocket 46, in which the intermediate element 44 is arranged, can be seen. Illustrated in dashed line is the conductor element 42, which serves to conduct current in the circumferential direction. The conductor end has the reference sign 22. The intermediate element 44 is for example a metal component, for example made of copper, which can be plastically deformed against the stop 50 when the contact element is being arranged, as a result of which a secure mechanical and also electrical contact-connection can be provided.

LIST OF REFERENCE SIGNS

10 Rotor
12 Rotor tooth
14 Rotor slot
20 Conductor material
22 Conductor end
24 Current collecting element
25 Connection lug
40 Contact element
42 Conductor element
44 Intermediate element
46 Pocket, slot
48 Securing element
50 Stop
60 Rotor shaft
R Rotor axis

The invention claimed is:

1. A rotor comprising:
a main rotor body, which comprises a plurality of rotor teeth; and
a conductor material wound around the rotor teeth to form a winding,
wherein the conductor material has conductor ends, which are pressed axially against a stop by a contact element to establish an electrically conductive connection,
wherein the contact element or the stop is configured to electrically conductively connect at least two of the conductor ends in a circumferential direction,
wherein the contact element or the stop comprises a conductor element, which makes it possible to provide the electrically conductive connection between the at least two of the conductor ends in the circumferential direction,
wherein the contact element or the stop comprises a plurality of pockets which have a ray-like arrangement and are configured to arrange and position the conductor ends, and
wherein an intermediate element, which is configured to deform during a pressing operation for connection to the conductor element, is arranged in at least one of the pockets.

2. The rotor according to claim 1,
wherein the main rotor body is surrounded with potting material to form a sheath, and
wherein the sheath forms the stop.

3. The rotor according to claim 1,
wherein the contact element is axially positionally fixed by a securing element.

4. The rotor according to claim 1,
wherein the intermediate element provides the electrically conductive connection to the conductor element.

5. The rotor according to claim 2,
wherein at least one of the contact element or the sheath is configured to provide an electrically conductive connection to a current collecting element or slip ring module along a rotor axis.

6. The rotor according to claim 1,
wherein the contact element is in a form of a current collecting element.

7. A method for producing a rotor, the method comprising:
providing a rotor body and a winding conductor material around the rotor body to form a winding, wherein the winding has conductor ends;
pressing the conductor ends against a stop via a contact element; and
establishing an electrically conductive connection between at least two of the conductor ends via the contact element or the stop,
wherein the contact element or the stop comprises a conductor element, which makes it possible to provide the electrically conductive connection between the at least two of the conductor ends in the circumferential direction,
wherein the contact element or the stop comprises a plurality of pockets which have a ray-like arrangement and are configured to arrange and position the conductor ends, and
wherein an intermediate element, which is configured to deform during a pressing operation for connection to the conductor element, is arranged in at least one of the pockets.

* * * * *